Sept. 6, 1927. 1,641,502
L. G. PRICE
COMBINATION BUMPER, LUGGAGE CARRIER, AND TRAILER HITCH ATTACHMENT
Filed April 8, 1927 2 Sheets-Sheet 1

INVENTOR
L. G. Price
BY
ATTORNEY

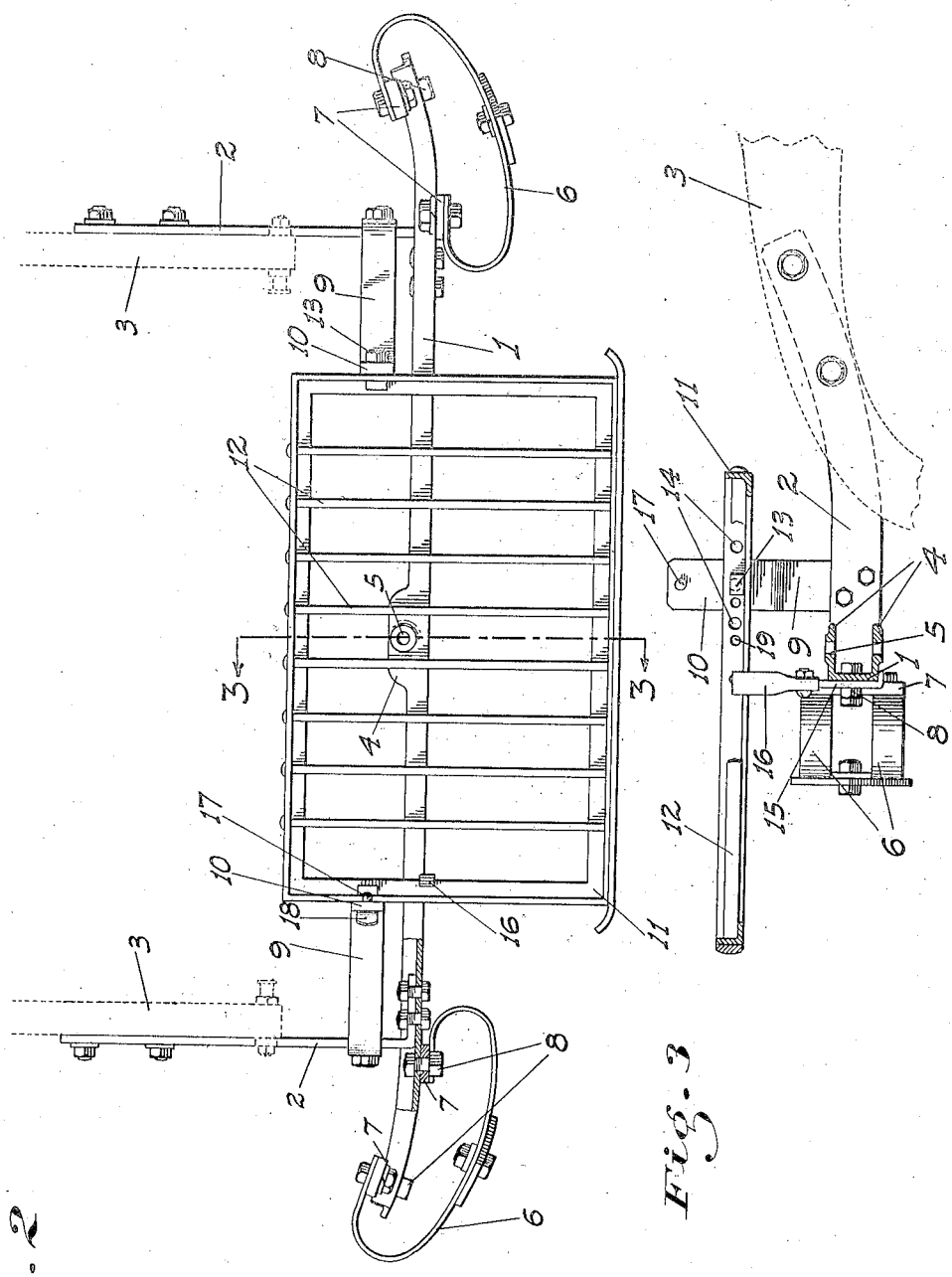

Patented Sept. 6, 1927.

1,641,502

UNITED STATES PATENT OFFICE.

LEONARD G. PRICE, OF MODESTO, CALIFORNIA.

COMBINATION BUMPER, LUGGAGE CARRIER, AND TRAILER HITCH ATTACHMENT.

Application filed April 8, 1927. Serial No. 182,007.

This invention relates to accessories for motor vehicles, my principal object being to provide as a single unitary attachment a combined bumper, luggage carrier and trailer hitch device. This device is so constructed that the tongue of a trailer may be readily connected thereto, without detaching or disturbing any other features of the attachment, and the luggage carrying rack can be put into use when the trailer is hitched to the device just as well as when the trailer is detached.

Further objects of the invention are to provide a device of this character so constructed that the position of the rack on its supports may be shifted back or forward, according to the space to be left between the rack and the body of the vehicle for a spare tire or the like; and a device from which the bumper units may be removed for replacement or repairs, without disturbing any of the other features of the attachment. The structure is also arranged so that it may be very easily and quickly applied to or detached from a vehicle, and all parts of the same may be easily disassociated from each other so as to facilitate shipment.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a top plan view of the device.

Fig. 3 is a cross section on the line 3—3 of Fig. 2.

Figure 1:
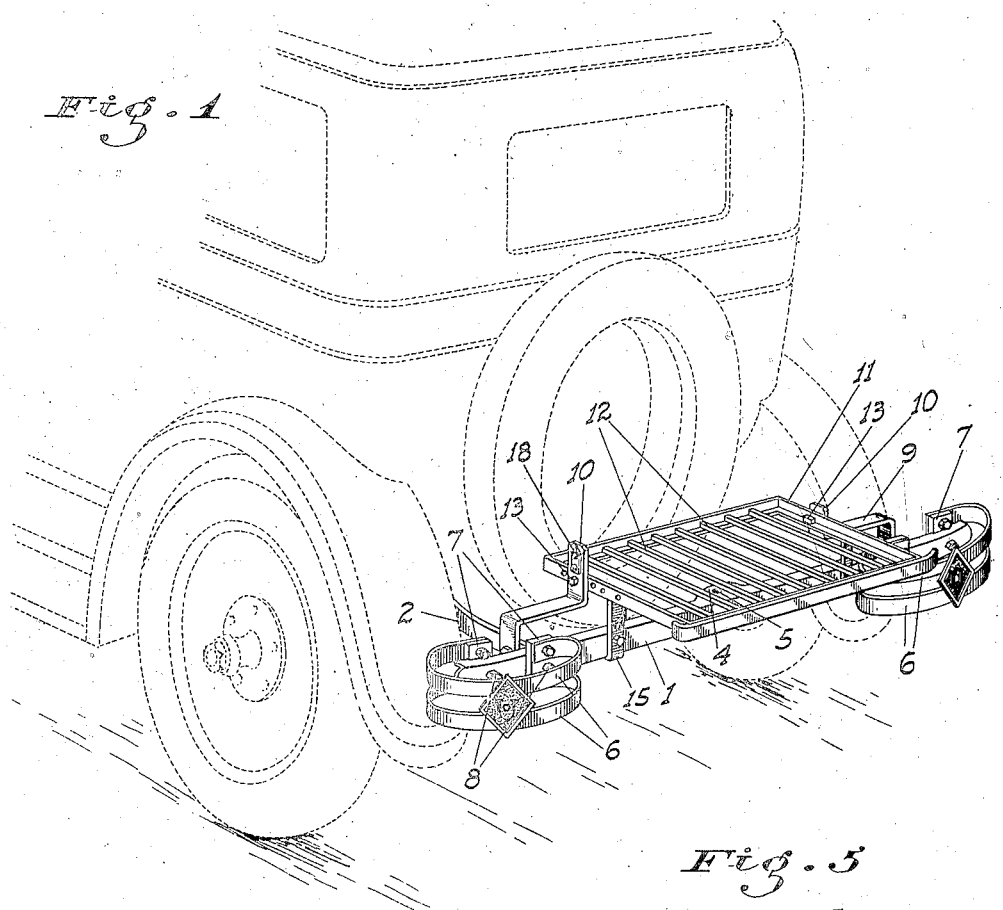
Fig. 1 is a perspective elevation of my improved attachment as mounted on a vehicle.

Referring now more particularly to the characters of reference on the drawings, the structure comprises a rigid transverse beam 1. preferably of channel shaped cross section with the side flanges horizontally disposed and facing forward, so that a relatively light and yet strong and non-yielding beam is provided. This beam is forwardly curved at its ends, and about at the inception of the curved portion has forwardly extending arms 2 connected thereto. These arms are adapted to be bolted to the outsides of the main frames 3 of a vehicle so that said beam will be disposed a certain distance rearwardly of said frames as shown in Fig. 2. Centrally between its ends the beam 1 is provided with forwardly projecting and vertically spaced lugs 4, secured to the side flanges of said beam, and provided with vertically alined orifices 5 to receive the coupling pin of the clevis of a trailer tongue. When connecting the tongue, the clevis straddles the beam and lugs from the rear, so that the clevis-holes aline with the lug orifices to receive the holding pin therethrough. If the tongue ends in a single flat orificed element, it preferably overhangs the beam so as to bring said element into alinement with the lugs.

Bumper devices, of the type commonly known as tips, and comprising vertically spaced spring bands 6 having a suitable curvature in a horizontal plane, are mounted at the ends of the beam to project rearwardly of the same, and so as to protect the rear fenders of the vehicle. This mounting is accomplished by means of vertical blocks 7 to which the ends of the spring bands are removably bolted, these blocks abutting against the beam 1 and being detachably secured thereto by bolts 8. It will therefore be seen that these bumper units may be easily detached from the main beam when desired, and the bands forming the bumpers may then be readily disassociated from each other.

Figure 4:
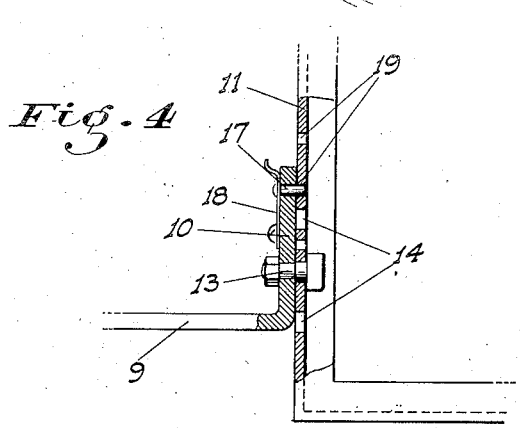
Fig. 4 is a fragmentary vertical section through one of the carrier supports and the carrier frame, the latter being vertically disposed or in a non-operative position.
Figure 5:
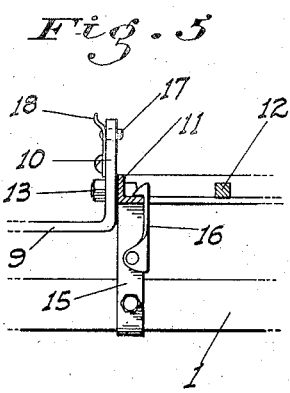
Fig. 5 is a fragmentary end view of the above parts, showing the catch means provided for holding the carrier against movement when the latter is outstretched.

Secured to and projecting upwardly and toward each other from the arms 2 intermediate their ends are brackets 9, terminating in vertical transversely alined ears 10. Supported by the brackets and disposed between the ears is a luggage carrying rack comprising a rectangular frame 11, preferably formed of angle iron, with longitudinal bars 12 extending between the ends of this frame at transversely spaced intervals. The frame 11 is pivotally supported from the ears 10 by bolts 13 which project through said ears and through any at a time of a number of longitudinally spaced holes 14 in the sides of the frame as shown in Fig. 4. This enables the longitudinal setting of the carrier, when outstretched and lying horizontally, to be altered so as to alter the space between the front end of the frame and the body of the car. To maintain the carrier in a horizontal outstretched position, rigid supports 15 project upwardly from the beam 1 at such transversely spaced points thereon as to aline with and engage the under face of the sides of the frame 11. In order to prevent any possible jumping up of the carrier frame when it is thus positioned one of the supports 15 is provided with a spring catch 16 arranged to releasably engage the horizontal flange of the adjacent member of the frame 11 as shown in Fig. 5. The heads of the bolts 13 inside the frame 11 and the catch 16 do not project above the level of the tops of the bars 12 so as to interfere with the proper and even support of a tongue or the like on the bars.

To hold the carrier from swinging one way or the other when it is raised to its vertical and non-operating position, one of the ears 10 has a pin 17 slidably mounted therein, which pin is attached to a spring operating member 18 and is adapted to removably enter any one of a number of holes 19 in the adjacent carrier frame member; the spacing of these holes 19 being the same as that of the bolt holes 14 for obvious reasons.

All parts of the structure are detachably bolted onto the main beam 1 or onto each other, so that any such part may be readily removed for repairs or replacement when necessary, and the parts may be disassociated from each other to facilitate shipment. The tractor hitch device being rearwardly of the vehicle itself and not secured to the main frame or other part of the vehicle ahead of the rear end of the body thereof as is now customary, a trailer may be easily connected to the device with a minimum of trouble and the use of the luggage carrier at such time is not interfered with in any way.

The beam 1 being a rigid element throughout also serves as a valuable protection for the back of the car, even though of course it has no spring qualities.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A trailer-hitch attachment for a motor vehicle including a rigid beam, means for securing the beam to the vehicle to the rear and transversely of the same, and an orificed lug on the beam centrally of the length thereof.

2. An attachment for a motor-vehicle including a beam to extend transversely of the vehicle, arms to extend longitudinally of the vehicle secured to the beam, brackets projecting upwardly from the arms intermediate their ends, and a luggage carrier supported by the brackets.

3. An attachment for a motor-vehicle including a beam to extend transversely of the vehicle, arms to extend longitudinally of the vehicle secured to the beam, brackets projecting upwardly from the arms intermediate their ends, a luggage carrier frame pivotally mounted on the brackets, and supports for engagement with the frame when the latter is outstretched horizontally, projecting upwardly from the beam.

4. An attachment for a motor-vehicle including a beam to extend transversely of the vehicle, means for securing the beam to the vehicle, a bumper unit comprising vertically spaced spring bands, blocks extending between and bolted onto the bands, and bolts detachably securing the blocks to the beam.

5. An attachment for a motor vehicle including brackets, means for mounting the brackets onto the vehicle, a luggage carrier frame pivotally mounted on the brackets, and spring catch means between the frame and one of the brackets for holding said frame in a predetermined position relative to the bracket.

6. An attachment for a motor vehicle including brackets, means for mounting the brackets onto the vehicle, a luggage carrier frame extending between the brackets, and bolts mounted in the brackets; said bolts being adapted to project through any at a time of a plurality of longitudinally spaced holes in the carrier frame.

7. A structure as in claim 6, with releasable catch means between the frame and one of the brackets for holding the frame rigid relative to said bracket regardless of which ones of the frame-holes the bolts engage.

8. An attachment for a motor vehicle including brackets, means for mounting the brackets on the vehicle, a luggage carrier frame pivotally mounted on the brackets, a member adapted for connection to a trailer tongue, and means for supporting said member in connection with the bracket mounting means.

9. An attachment for a motor vehicle including brackets, means for mounting the brackets on the vehicle, a luggage carrier-frame pivotally mounted on the brackets, a support for engagement with the frame when the latter is horizontally disposed secured in connection with the brackets, and spring catch means mounted for detachable engagement with the frame when the latter is resting on the support.

In testimony whereof I affix my signature.

LEONARD G. PRICE.